United States Patent [19]
Bloom

[11] Patent Number: 5,530,681
[45] Date of Patent: Jun. 25, 1996

[54] CASCADED SHIFT REGISTER BEAMFORMER

[75] Inventor: Elliot L. Bloom, Newport, R.I.

[73] Assignee: Raytheon Company, Lexington, Mass.

[21] Appl. No.: 507,408

[22] Filed: Jun. 24, 1983

[51] Int. Cl.$^6$ .................................................. G01S 3/82
[52] U.S. Cl. ............................................................ 367/123
[58] Field of Search .............................. 333/165; 377/61, 377/62, 63; 367/123

[56] References Cited

U.S. PATENT DOCUMENTS

| | | | |
|---|---|---|---|
| 4,149,128 | 4/1979 | White | 333/165 |
| 4,152,678 | 5/1979 | Shott et al. | 367/123 X |
| 4,253,168 | 2/1981 | Petrosky et al. | 367/123 |
| 4,288,764 | 9/1981 | Ong | 333/165 |

OTHER PUBLICATIONS

Inter. Electron Devices Meeting (Technical Digest) Wash., D.C., Dec. 1976, by Séquin, pp. 31–34.
R. D. Melen et al, "CCD Dynamically Focussed Lenses for Ultrasonic Imaging Systems", Proc. 1975 Naval Electron Lab. Center Int. Conf. on the App. of CCD's, pp. 165–171.

*Primary Examiner*—Daniel T. Pihulic
*Attorney, Agent, or Firm*—Donald F. Mofford

[57] ABSTRACT

Charge coupled shift registers for sonar beamforming provide many channels of high resolution large delays by the cascading of two registers. Two equivalent embodiments are disclosed. In one embodiment the shift rate of the input shift register is an integer multiple "m" of the shift rate of the output shift register which is responsive to every m th signal presented to it. The other embodiment samples the signal in the input register by selected m th pulses of a pulse train whose frequency is m times the shift frequency of the output register. Each embodiment preserves the higher resolution phase information and incremental delay of the higher frequency sampling of the input shift register. The long time delay is provided by the output shift register operating at the lower shift rate.

12 Claims, 5 Drawing Sheets

CASCADED SHIFT REGISTER BEAMFORMER

The Government has rights in this invention pursuant to Contract No. N00024-82C-6163 by the Department of the Navy.

BACKGROUND OF THE INVENTION

Beamforming provides signal-to-noise enhancement by combining the individual responses of a plurality of sensors in such a manner that the composite response is maximized in a specific direction, thus providing spatial filtering. This is achieved by compensating for the variations in the signal wavefront arrival time at the various sensors. The variations in the wavefront arrival time from a specific direction are equalized by introducing time delays to the sensor outputs. In addition, a shading (weighting) function is usually applied to the sensor responses to suppress grating lobes, local maxima in the composite response, inherent in the spatial filter.

Time delays can be generated by various techniques. The conventional analog techniques approximate time delays using Bessel filters or allpass networks. The major drawback to these circuits is performance degradation due to component value tolerances and variations with age and over the environmental conditions. The preferred approach is true time delay generation employing shift registers which provide accurate, repeatable delays. The signal is sampled and loaded into a First-In/First-Out (FIFO) shift register. Each time a new sample is entered, all the samples currently residing in the register move down one stage, and the sample at the far end is "pushed out." A register of length N sampling and shifting a signal at rate $f_s$ delays the signal by $N/f_s$. In general, a beamformer with numerous sensor inputs requires a different delay for each input. (In some cases, symmetry conditions reduce the required number of different delays). The time delay produced by the shift register, $N/f_s$, can be changed by varying either the register length, N, or the sample/shift rate, $f_s$. However, in a sampled data system, it is desirable to use a single sample rate to avoid aliasing of clock artifacts. This is particularly important when large dynamic range is required since the aliased clock artifacts can be large compared to low level input signals. It is known that the use of multiple sample rates can cause in-band contamination even when they are synchronized by a master clock, unless specific, restrictive conditions are met. Therefore, the various delays are generated by employing shift registers of different lengths, all clocked at the same rate. This is depicted in FIG. 1, where 37 parallel registers 11 of a differing number of stages are simultaneously clocked at the same 980 KHz rate to provide a beamformer 10 (the summing circuit is not shown) for one configuration of sensors 12 and for one beam direction.

Although the time delays generated by a set of parallel FIFO shift registers are extremely accurate and repeatable, they may not be precise. The time delay through a shift register is a multiple of the sample/shift period; in other words, time is quantized by the sampling process. Therefore, given an arbitrary desired time delay, the closest integer multiple of the sample/shift period must be chosen, which means that the time delay error can be as large as $\pm\frac{1}{2} f_s$. Deviations from "ideal" time delays degrade the beam pattern, especially by increasing the magnitude of the grating lobes. Hence, it is often necessary to sample/shift the signal at a rate much higher than the Nyquist frequency to reduce the time delay quantization error. If long time delays are required to form the beam, then the shift register length can become prohibitively long.

SUMMARY OF THE INVENTION

In a monolithic structure such as the Charge Transfer Device beamformer of this invention, the chip area is an important factor in the yield of good devices, and ultimately, cost. Hence, it is an object of this invention to minimize the register length without increasing the time delay quantization error.

It is a further object of this invention to provide on a single chip all the shift registers required for a beamformer.

It is a feature of this invention that the many channels of high resolution large delays needed for sonar beamforming are provided by cascading two charge coupled shift registers, each operating at different shift rates. The high shift rate of the short-delay input shift register is an integer multiple of the lower shift rate of the long-delay output shift register, thereby preserving the higher resolution phase information and incremental delay of the higher frequency sampling of the input shift register. The long time delay is provided by the output shift register operating at the lower shift rate while preserving the delay resolution of the high shift rate register.

BRIEF DESCRIPTION OF THE DRAWINGS

The objects and features of this invention are explained in the following description taken in conjunction with the accompanying drawings, in which:

FIG. 1 is a pictorial diagram of typical shift register lengths for a prior-art beamformer having one shift frequency;

DESCRIPTION OF THE PREFERRED EMBODIMENT

Figure 2:
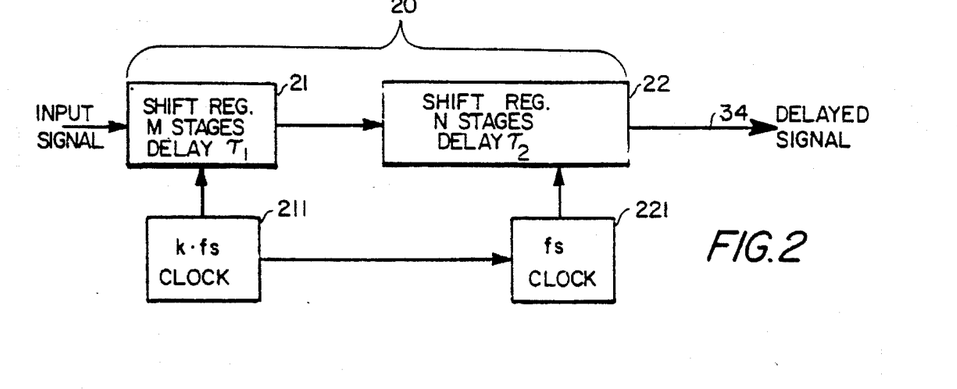
FIG. 2 is a block diagram of a two-section shift register delay line.

Referring now to FIG. 2, there is shown two cascaded shift registers 21, 22 in accordance with this invention operating at different rates to provide a two-section shift register 20 having high time-delay resolution while minimizing the total register length or stages for a given time delay. The second (or output) register 22 generates long delays with coarse resolution; the first (or input) register 21 generates short dielays with fine resolution. The long delay. $\tau_2$, generated by the second register of length N (N stages) and clocked by clock 221 at rate $f_s$, is:

$$\tau_2 = N/f_s$$

The incremental time delay is $1/f_s$. The first register 21 of length M is clocked by clock 211 at a faster rate, a multiple k of $f_s$. The time delay is:

$$\tau_1 = M/kf_s \text{ where } 0 \leq M \leq (k-1)$$

which has an incremental time delay of $1/kf_s$. Hence, the first register 21 time delay resolution is k times the second register 22 resolution. The maximum length of the first register 21 is (k−1), since it only has to provide delays smaller than the coarse delay-resolution $1/f_s$ of the second register 22. The total delay is:

$$\tau = \tau_1 + \tau_2 = M/kf_s + N/f_s = (M+kN)/kf_s$$

This time delay is equivalent to a shift register of length M+kN, clocked at a rate $kf_s$. Hence, the cascaded-registers 20 provide the same time delay resolution, $1/kf_s$, as the single register approach, but with less total stages or total register length (M+N) as opposed to (M+kN) stages for a single register.

Since the second register re-samples the first register output at an integer submultiple, 1/k, of the first section sample rate, aliasing of clock artifacts only appears at input frequencies which are multiples of the second register rate and at direct current, all of which are outside the usual frequency band of interest.

Figure 3:
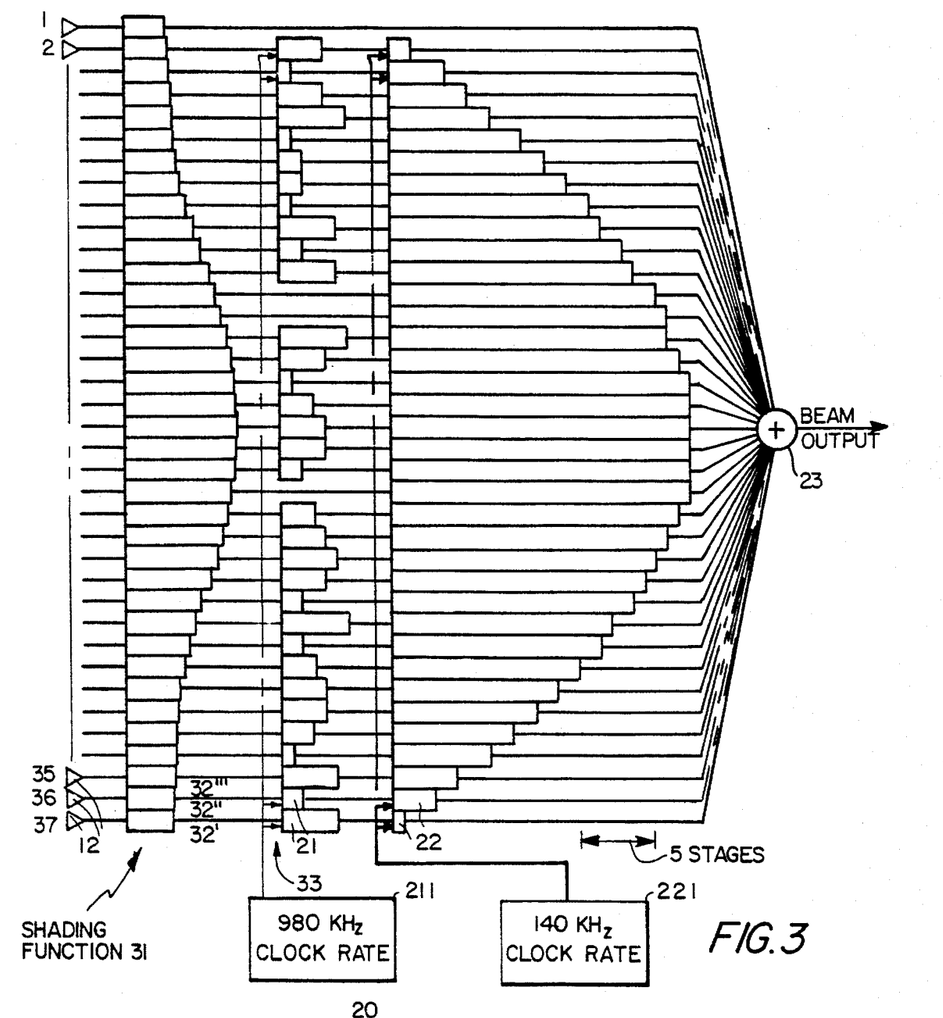
FIG. 3 is a pictorial diagram of shift register lengths for a beamformer using two-section shift registers.

A monolithic beamformer 30 employing the cascaded two-register structure is shown in FIG. 3. There are 37 Charge Transfer Device (CTD) cascaded shift registers 21, 22, one for each input signal. Prior to time-delaying the input signals, the shading function (of weighting factors) 31 is applied. In the actual CTD device, the weighting factor 32 for each channel is produced by fabrication of the appropriate input capacitance of each channel wherein the input signal voltage of each channel is converted to a charge packet proportional to input capacitance. The outputs of shift register 22 are added in summing circuit 23 to provide the beamformer 30 output.

The time delay registers 21 of FIG. 3 vary in length from 0 to 6 stages, and are clocked at 980 KHz, which provides a 1.02 µs time delay resolution. The cascaded time delay registers 22 of FIG. 3 are clocked at 1/7th the rate, 140 KHz, which provides time delay increments of 7.14 µs. The longest register 22 has 27 stages. The total number of analog shift register stages on the chip is 752. If the prior art single shift frequency, single register technique is used, 4605 stages are required, which is over 6 times the number of stages in the cascaded-register design of this invention.

In addition to saving chip area, the cascaded-register design consumes much less power than the single register design. Power dissipation in CTD's is primarily due to the displacement current supplied to the shift register cells. The current is proportional to both the total capacitance and the shift rate. The cascaded-registers' design reduces both the number of cells, hence the capacitance, and the shift rate (the majority of cells are clocked at the lower rate). Hence, the power consumption is significantly reduced in the two-section approach.

The ratio of the clock frequencies, k, cannot be made arbitrarily large. As previously described, the second register 22 re-samples the signal at a submultiple of the first register 21 sample rate. Hence, the overall sample rate equals the second register 22 clock rate, which must conform to Nyquist requirements. For example, suppose a time delay resolution of 1 µs is wanted. This implies a first stage sample rate of 1 MHz. In addition, let the maximum signal frequency be 40 KHz. This limits the second stage sample rate to greater than 80 KHz (even larger for reasonable cascaded shift register 20 input and output filters). Therefore, a "k" factor of 12 (1 MHz/12=83.3 KHz) could be used, but not k=13 (1 MHz/13=76.9 KHz). k must be an integer to avoid aliasing clock artifacts.

The desired time delay differences between channels may be obtained by simultaneously sampling the input signals received by the transducer of each channel and then delaying the sampled signals by the desired different channel delay; or the input signals received by the transducer of each channel may be sampled at a different time, the difference in sampling time being equal to the time delay difference desired between channels.

Figures 4A, 4B:
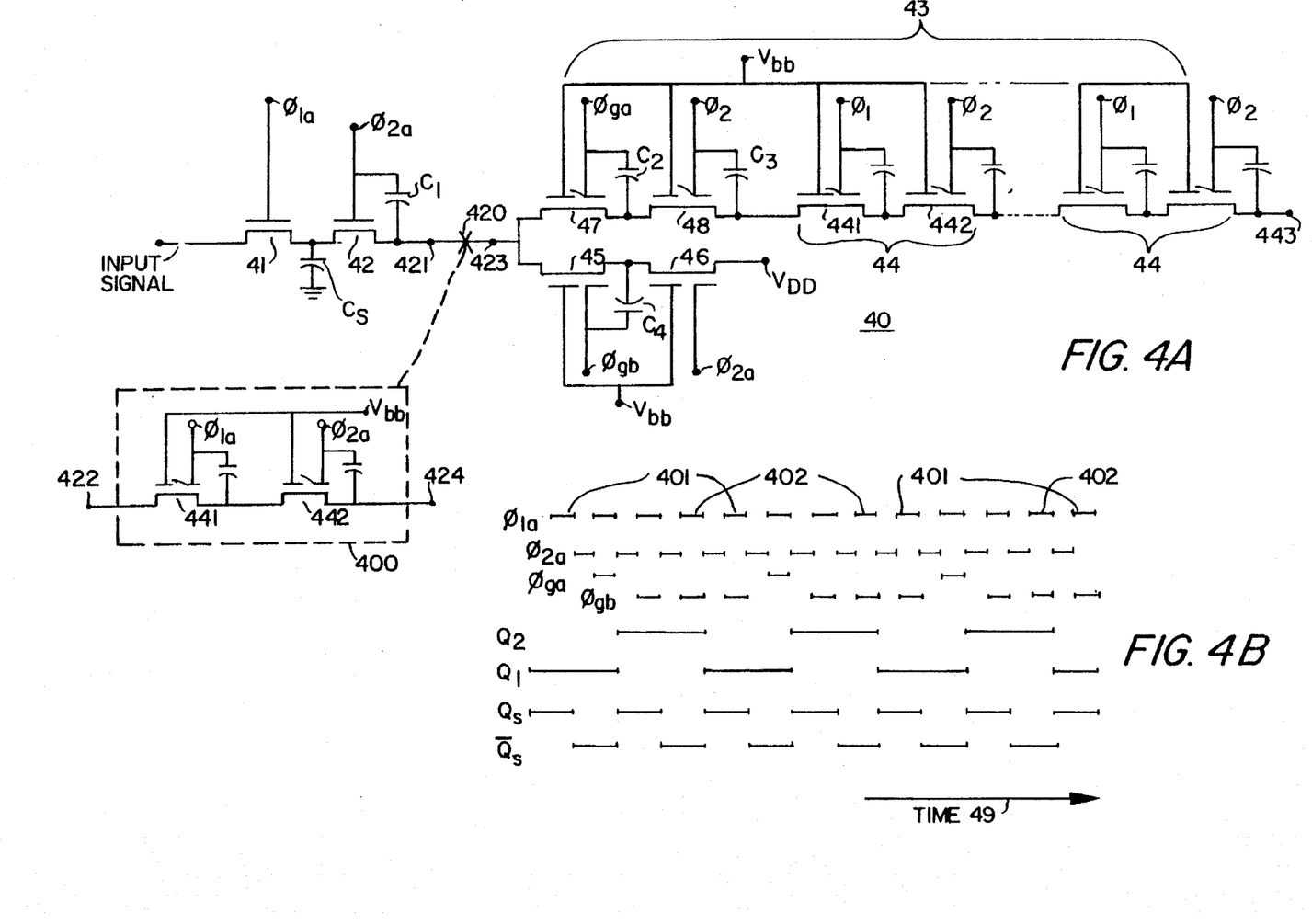
FIGS. 4A, 5A and 5B are schematics of different embodiments of charge-transfer-device two-section shift registers.
FIGS. 4B and 5C show timing diagrams of shift voltages applied to the circuits of FIG. 4A and FIGS. 5A, 5B, respectively.

Referring now to FIG. 4A, there is shown a CTD shift register circuit 40 which may be used to implement the block diagram of FIG. 2 for the case where k=4. FIG. 4B shows a timing diagram of transfer voltages Ø whose "high" states are represented as solid lines. The absence of a line indicates a "low" state. The phasing of the voltages Ø is indicated by the distribution of the "high" states along the time axis 49.

The input signal is sampled by the voltage $\emptyset_{1a}$ which samples the signal during $\emptyset_{1a}$ (high) and stores the sample as charge in capacitor $C_s$ through CTD 41. The amount of charge stored in $C_s$ is determined by the capacity of $C_s$ designed into CTD 41 dependent upon the weighting factor 32 assigned to the shift register of which $C_s$ is in the first stage. The charge stored in $C_s$ at the termination of the high state of $\emptyset_{1a}$ is transferred to capacitor $C_1$ through CTD 42 when $\emptyset_{2a}$ thereafter goes high and is retained in $C_1$ when $\emptyset_{2a}$ later goes low. All channels of the beamformer are sampled by the $\emptyset_{1a}$ voltage waveform. The shift signals $\emptyset_{1a}$ and $\emptyset_{1b}$ are square waves 180° out of phase with each other and have a frequency $4f_s$ where $f_s$ is the frequency of square wave shift signals $\emptyset_1$, $\emptyset_2$.

The circuit 40 is designed to select every fourth sample signal stored in capacitor $C_1$ and provide that selected signal at terminal 423 for subsequent shifting in a CTD shift register 43 at the lower rate $f_s$ by the shifting voltages $\emptyset_1$, $\emptyset_2$. The time of occurrence of the transfer voltage $\emptyset_{ga}$, which occurs during the low state of every fourth period of the switching signal $\emptyset_{2a}$, determines that the immediately preceding $\emptyset_{2a}$ sampled signal is selected from the four signal samples provided by signal $\emptyset_{2a}$. The remaining three sampled signals provided by $\emptyset_{2a}$ are diverted into capacitor $C_4$ by three consecutive high $\emptyset_{gb}$ shift signals applied to CTD 45. $\emptyset_{ga}$ and $\emptyset_{gb}$ are not high at the same time. The shift signal $\emptyset_{2a}$ transfers these three sampled signals through CTD 46 to a voltage source $V_{DD}$ where they are absorbed.

Thus, the desired one sample of the four samples of the input signal stored in capacitor $C_1$ by $\emptyset_{2a}$ is transferred to capacitor $C_2$ through CTD 47 by the high state of shift signal $\emptyset_{ga}$ next following $\emptyset_{2A}$. The charge is shifted out of $C_2$ through CTD 48 into capacitor $C_3$ by the high $\emptyset_2$ shift pulse next following the high state of $\emptyset_{ga}$. The charge in capacitor $C_3$ is transferred down successive stages 44 of shift register 43 by shift signals $\emptyset_1$, $\emptyset_2$ applied to alternate one-half stages such as the two stages 441, 442 of the register. The number of stages 44 in the shift register 22 of each channel determines the coarse delay for each channel.

The circuit of FIG. 4A as described in the preceding paragraph provides at its output 443 a delayed signal corresponding to the input signal sampled by the $\emptyset_{1a}$ pulses 401. In order to provide a delayed sampled output signal which is sampled by a different group of $\emptyset_{1a}$ pulses such as those identified by the numeral 402, it is necessary to delay the signal sampled by $\emptyset_{1a}$ by one period of the signal $\emptyset_{1a}$. This delay is provided by interrupting the signal path of circuit 40 at point 420 and inserting a delay circuit 400 so that its input 422 and output 424 are connected to terminals 421, 423, respectively. The delay circuit 400, operating in the same manner as stage 44 but at the higher frequency of $\emptyset_{1a}$, provides a delay of one period of the shift signal $\emptyset_{1a}$. One delay circuit 400 causes the signal sampled by $\emptyset_{1a}$ 402 to be shifted into the shift register 43 by the $\emptyset_{ga}$ "high" shift signal rather than the signal sampled by $\emptyset_{1a}$ 401 as described earlier.

Where incremental delays of two or three periods of $\emptyset_{1a}$ are desired, two or three circuits 400, respectively, are serially connected and inserted into circuit 40 between terminals 421, 423.

Thus it is seen that the total delay required for each channel of the beamformer depicted in FIG. 3 is provided by the selection of the number (M=0, 1, 2 or 3) of circuits 400 for determining the time delay (M/4 f) of the sampled input signal and by the selection of the number N of stages 44 for determining the coarse delay (N/f). The total delay in each channel is (M+4N)/4 f, with M and N being chosen for each channel to provide the delay required for each channel by the beamformer design as well known to those skilled in the art.

Figure 4C:
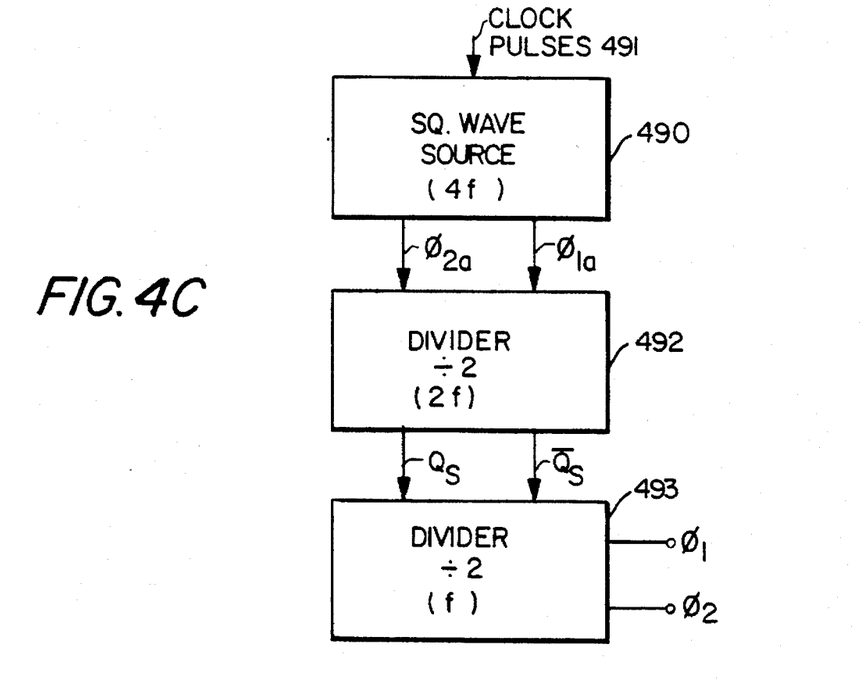
FIGS. 4C and 5D show block diagrams of circuits for providing shift voltages for the circuits of FIGS. 4A and FIGS. 5A, 5B, respectively.
Figure 4D:
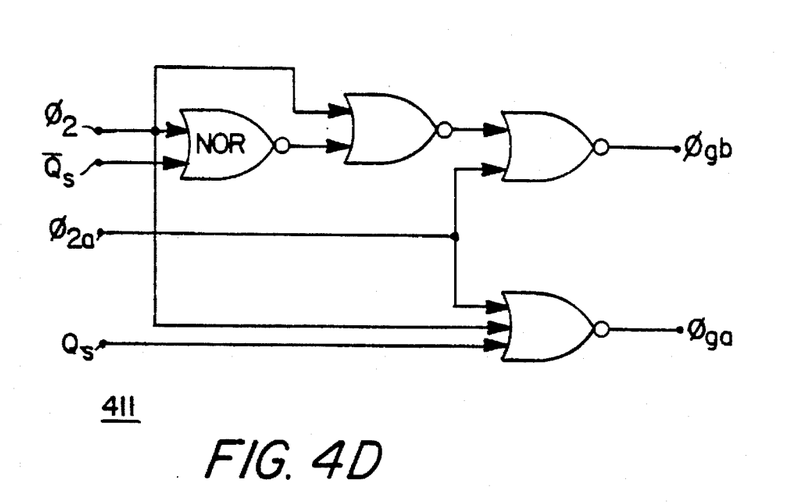
FIGS. 4D and 5E show logic diagrams for providing other shift voltages for the circuits of FIGS. 4A and FIGS. 5A, 5B, respectively.

The shift signals $\emptyset_{1a}$, $\emptyset_{2a}$ a frequency 4 f are provided, as shown in FIG. 4C, by square wave source 490 in response to clock pulses 491. A divider 492 provides square waves $Q_s$, $\overline{Q}_s$ at frequency 2 f which are further divided in divider 493 to provide shifting square waves $\emptyset_1$, $\emptyset_2$ at frequency f. The logic circuit 40 of FIG. 4D comprises a NOR circuit 411 which provides the high output states for $\emptyset_{ga}$ and $\emptyset_{gb}$ when the inputs $\emptyset_{2a}$, $\emptyset_s$ and $\emptyset_2$ have the states shown on the timing diagram of FIG. 4B as is well known to those skilled in the art.

Figure 5A:
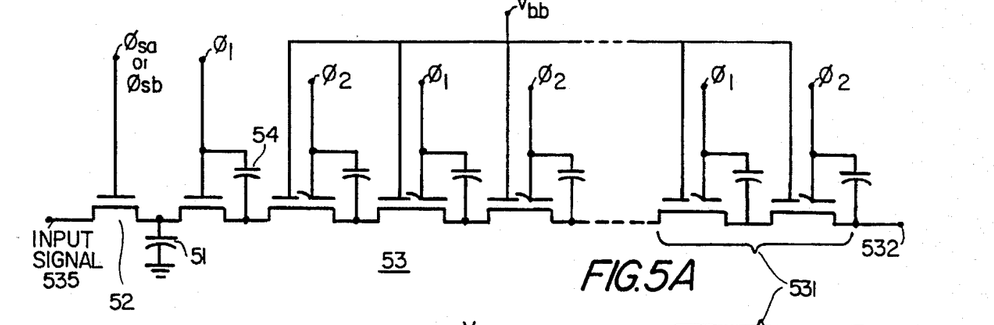
Figure 5B:
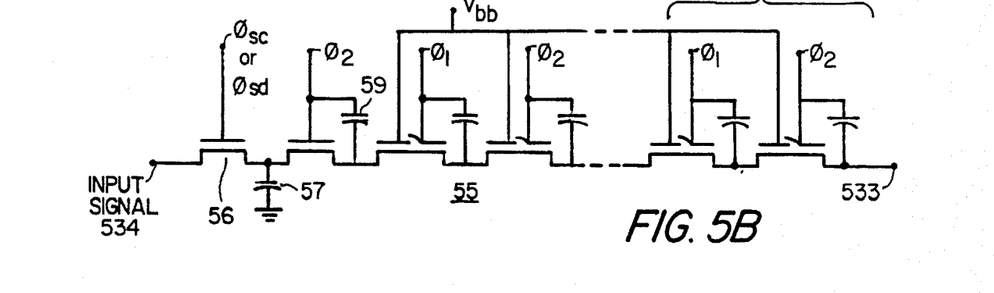
Figure 5C:
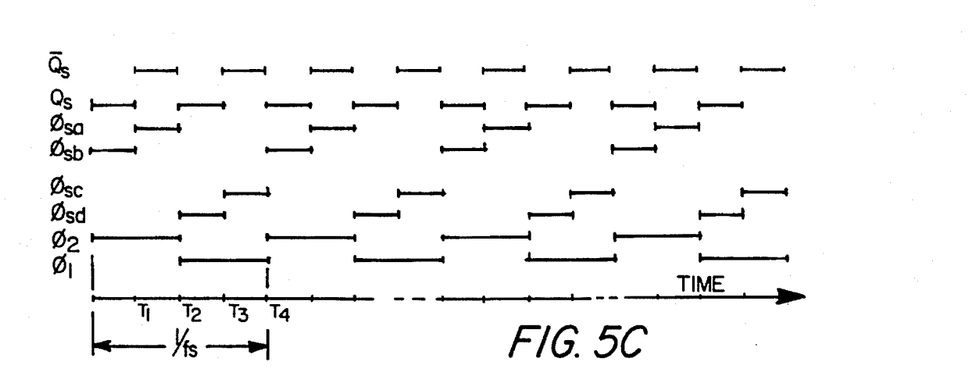

An alternative embodiment of the invention is shown in FIGS. 5A and 5B which provides the fine increment of delay in a different way from that of FIG. 4. In FIG. 5, four sampling signals $\emptyset_{sa}$, $\emptyset_{sb}$, $\emptyset_{sc}$, $\emptyset_{sd}$ are provided, each having a "high" state for a different one-fourth of the period of the shift frequency $f_s$ of the shift signals $\emptyset_1$, $\emptyset_2$. These high states are shown on the timing diagram of FIG. 5C. Each transducer of an array will be connected to a circuit of either the type of FIG. 5A or 5B and sampled by either $\emptyset_{sa}$ or $\emptyset_{sb}$, and $\emptyset_{sc}$ or $\emptyset_{sd}$, respectively. Assume for the purpose of explanation that a transducer is connected to the circuit of FIG. 5A having the sampling signal $\emptyset_{sa}$. The charge accumulated in capacitor 51 through CTD 52 is proportional to the input signal during the sampling time when $\emptyset_{sa}$ is high and to the size of capacitor 51. The charge stored in capacitor 51 when $\emptyset_{sa}$ becomes low at time $T_1$ is transferred through the shift register 53 at the rate $f_s$ by the alternate high values of the shift voltages $\emptyset_1$, $\emptyset_2$. The total delay is determined by the number of CTD stages connected to the $\emptyset_1$, $\emptyset_2$ shift voltages plus the incremental fine delay provided by the input stage connected to $\emptyset_{sa}$. Since there is no time delay between the termination of the high state of $\emptyset_{sa}$ and the commencement of the high state of $\emptyset_1$, the combination of $\emptyset_{sa}$ and $\emptyset_1$ will be considered to provide no incremental fine delay. However, if the sampling signal is $\emptyset_{sb}$ in FIG. 5A, there will be a time ($T_2-T_1$) during which the charge is stored in capacitor 51 at the termination of $\emptyset_{sb}$ before shifting signal $g_1$ transfers the charge to capacitor 54. Thus, the choice of sampling signals. $\emptyset_{sa}$, $\emptyset_{sb}$ produces a time delay difference of 1/(4 fs). Since the last stage 531 of the shift registers 53, 55 is shifted by the $\emptyset_2$ signal, the output signals from shift registers 53, 55 will be in time registration and the 1/(4 $f_s$) time delay difference in their respective output signals 532,533 is produced by the 1/(4 $f_s$) difference in the time at which the input signal 534 is sampled by $\emptyset_{sa}$ or $\emptyset_{sb}$.

The circuit of FIG. 5B containing the shift register 55 is similar to that of register 53 except for having one less $\emptyset_1$ stage and not being sampled by $\emptyset_{sa}$ or $\emptyset_{sb}$. The input signal 535 is sampled by either $\emptyset_{sc}$ or $\emptyset_{sd}$ through CTD 56 and stored in capacitor 57. The size of capacitor 57 determines the weighting factor 32 applied to the sampled signal of FIG. 5B. The first stage of the shift register 55 is energized by shift pulse $\emptyset_2$ (delayed in time by 1/(2 $f_s$) with respect to shift pulse $\emptyset_1$). A signal 535 sampled by $\emptyset_{sc}$ is stored in capacitor 57 at the termination of $\emptyset_{sc}$ and is transferred into shift register 55 capacitor 59 by the next high state of shift pulse $\emptyset_2$. Since $\emptyset_2$ becomes high immediately after $\emptyset_{sc}$ becomes low, there is no time delay between $\emptyset_{sc}$ and $\emptyset_2$ but there is a time delay of 1/(2 $f_s$), between the $\emptyset_{sa}$ and $\emptyset_{sc}$ sampled signals because of the half period time difference between the high state of the shift signals $\emptyset_1$, $\emptyset_2$.

Alternatively, the sampled signal 535 provided by sampling signal $\emptyset_{sd}$ is held in capacitor 57 during the time interval $T_3$ to $T_4$ during which $\emptyset_2$ is low after which it is shifted into the capacitor 59 of shift register 55 by next high state of the shift signal $\emptyset_2$.

Figure 5D:
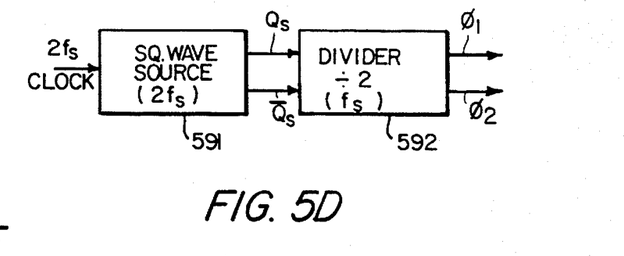

The sampling signals $\emptyset_{sa}$, . . . , $\emptyset_{sd}$ are obtained by applying a $Q_s$ or $\overline{Q}_s$ signal and a $Q_1$ or $Q_2$ signal as inputs to NOR circuits 58 shown in FIG. 5D. The signals $Q_s$, $\overline{Q}_s$ at frequency 2 $f_s$ are obtained from square wave source 591 clocked at a 2 $f_s$ pulse rate. Divide-by-two circuit 592 provides square waves $Q_1$, $Q_2$ at the $f_s$ frequency.

When the sampling and shift register circuits of FIGS. 5A and 5B are used in a beamformer, the last stage of all registers is shifted by either a $\emptyset_1$ shift pulse or by a $\emptyset_2$ shift pulse in order to have the shifted output of each shift register occur at the same time. The incremental time delays 1/(4 fs), 1/(2 $f_s$) and 3/(4 $f_s$) are obtained by the choice of the shift registers of FIGS. 5A or 5B and the sampling signals $\emptyset_{sa}$, . . . , $\emptyset_{sd}$. The total delay for each transducer signal is determined by the number of $\emptyset_1$ and $\emptyset_2$ stages of the CTD registers 53 or 55.

Figure 5E:
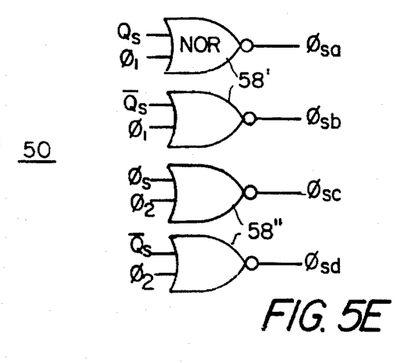

FIG. 5D is a block diagram showing how the shift voltages $Q_s$, $\overline{Q}_s$, $Q_1$ and $Q_2$ are obtained. The logic circuits of FIG. 5E provide the sample voltages $Q_{sa}$, $Q_{sb}$, $Q_{sc}$ and $Q_{sd}$ from the shift voltages.

Having described a preferred embodiment of the invention, it will now be apparent to one of skill in the art that other embodiments incorporating its concept may be used. It is felt, therefore, that this invention should not be limited to the disclosed embodiment, but rather should be limited only by the spirit and scope of the appended claims.

What is claimed is:

1. A beamformer system of the type having:

a plurality of transducers, each providing an input signal;

a plurality of delay lines, each connected to one of said plurality of transducers;

a summing means connected to the output of each of said delay lines, the improvement comprising:

each of said delay lines comprising a serially connected first and second shift register;

a source of first kf and second f shift frequencies connected to said first and second shift registers, respectively;

each of said first shift registers operating at said first shift frequency kf;

said second shift register operating at said second shift frequency f;

each of said first shift registers having a maximum of (k-1) stages and having its input connected to one of said transducers and sampling said input signal at said first shift frequency;

said second shift register having its output connected to said summing means; and said second shift register being responsive only to every k th output of said first shift register.

2. The beamformer of claim 1 wherein:

said first shift register has M stages to provide a delay of M/kf, each stage of said first register providing a delay of 1/kf;

said second shift register has the number N of stages required to produce a delay of N/f, each stage of said second register providing a delay of 1/f; and the total delay of said serially connected first and second registers being (M+kN)/kf.

3. A beamformer system of the type having:

a plurality of transducers, each providing an input signal;

a plurality of delay lines, each connected to one of said plurality of transducers;

a summing means connected to the output of each of said delay lines, the improvement comprising:

each of said delay lines comprising a serially connected first and second shift register;

a source of first and second shift frequencies connected to said first and second shift register, respectively;

said first shift register operating at said first shift frequency kf;

said second shift register operating at said second shift frequency;

said first shift register having its input connected to one of said transducers and sampling said input signal at said first shift frequency;

said second shift register having its output connected to said summing means;

said second shift register being responsive only to every k th output of said first shift register;

said first and second shift registers are in the form of cascaded charge transfer devices (CTDs);

means for gating every k th output of the output CTD of said first shift register to the input charge transfer device of said second shift register;

a third register of cascaded CTDs; and said gating means providing the remaining (k–1) outputs of the output CTD of said first shift register to the input CTD of said third register.

4. The beamformer of claim 3 wherein:

said gating means comprising the input CTD of each of said second and third registers;

means for providing a train of voltage pulses to said input CTD of said second register to transfer every k th charge of the output CTD of the first register to said second register;

means for providing a train of (k–1) consecutive voltage pulses to said first input CTD of said third register to transfer (k–1) consecutive charges from the output CTD of said first register to the input CTD of said third register.

5. The beamformer of claim 3 wherein the input charge transfer device of said first register has a storage capacitance which is of a magnitude proportional to the weighting factor to be provided to the signal which it is sampling.

6. The beamformer of claim 5 wherein said first register comprises one through k CTD stages of delay;

each stage comprising first and second CTDs, each connected to shift pulses of frequency kf, each shift pulse connected to said first and second CTD being 180° out of phase;

each stage of said first register having a delay time 1/kf; and said second register containing at least one CTD stage of delay, each stage comprising third and fourth CTDs connected to out-of-phase shift pulses of frequency f;

each stage of said second register having a delay time of 1/f.

7. The beamformer of claim 5 wherein said first register contains M CTD stages each having a delay time of 1/kf;

said second register contains N CTD stages each having a delay time of 1/f; and the serial connection of said first and second registers providing a total delay (M+kN)/kf.

8. A beamformer system of the type having:

a plurality of transducers, each providing an input signal;

a plurality of first delay means, each connected to said one of said plurality of transducers;

a slumming means connected to the output of each of said first delay means, the improvement comprising:

said first delay means comprising:

means for providing a train of sampling pulses at a frequency kf;

means for sampling said input signal with selected k th pulses of said sampling pulses to provide selected k th samples of said sampled signals at the output of said sampling means at the frequency f;

second means for delaying said sampled signal output of said sampling means in a shift register of N stages having a shift frequency f to provide a delay of N/f in said delay means of said sampled signal output;

the delay provided by said sampling means being determined by the time between each k th selected sample of said input signal and the shift frequency f of said delay means; and the total delay between said input signal and the output signal of said delay means being the sum of the delay provided by said sampling means and the delay N/f provided by said second delay means.

9. The beamformer of claim 8 wherein:

said sampling means comprises a CTD having a storage capacitance to which said sampling pulse providing means provides a shift pulse every 1/f seconds to cause said charge transfer device to store a sample of said input signal in its storage capacitance;

the size of said storage capacitance determining the weighting applied to said sampled input signal by determining the charge stored in said storage capacitance;

said charge being transferred through said delay means by said shift frequency and added in said summing means to the charges provided by the other delay means of said plurality.

10. The beamformer of claim 9 wherein:

said second delaying means comprises a plurality N of serially connected CTDs alternately connected to 180° out-of-phase shift voltages of a frequency f to provide a delay of N/f.

11. A time delay circuit comprising:

serially connected first and second shift registers;

a source of shift pulses of a frequency kf provided to said first shift register;

a source of shift pulses at a frequency f provided to said second shift register;

a signal source connected to the input of said first shift register and being sampled by every pulse of said pulses of frequency kf to provide sampled signals;

said sampled signals in said first shift register being shifted along said first shift register at the frequency kf;

said second shift register being responsive to only every k th sampled output signal of said first shift register; and said k th sampled signal being shifted along said second shift register at the frequency f.

12. A time delay circuit comprising:

means for providing an input signal;

a first delay means comprising:

means for providing a consecutive train of k sampling pulses within a time period of l/f; and means for providing an output sample of said input signal from a selected k th one of said k sampling pulses of said train of sampling pulses;

a second delay means connected to the output of said first delay means;

said second delay means comprising a shift register of N stages;

means for providing a shift frequency f to said shift register to provide an output signal having a delay of N/f in said shift register; and the total delay between said input signal and said output signal being the sum Of the delay provided by said selected k th ones of said k sampling pulses occurring within the time period l/f and the delay N/f provided by said shift register.

* * * * *